Aug. 26, 1930.  G. McCORMICK  1,773,740
METAL TIRED RAILWAY WHEEL
Filed Feb. 26, 1929
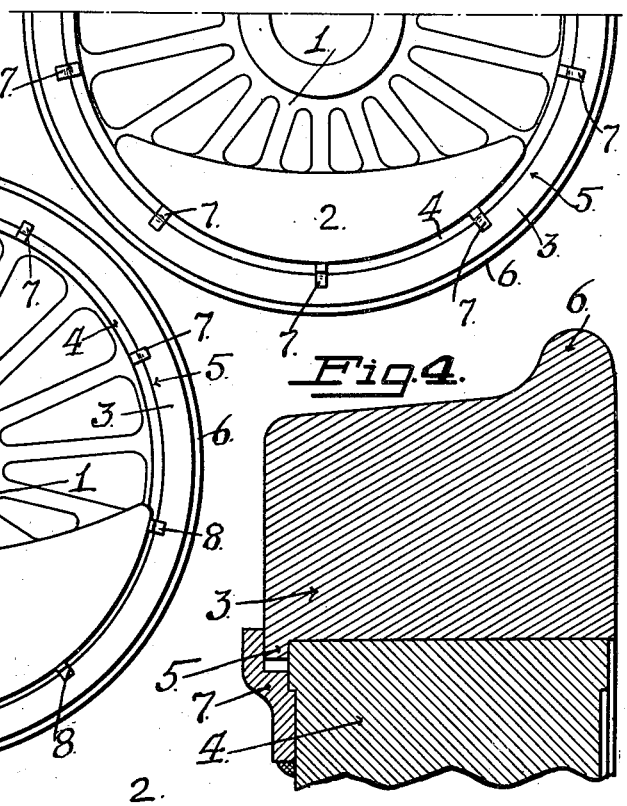
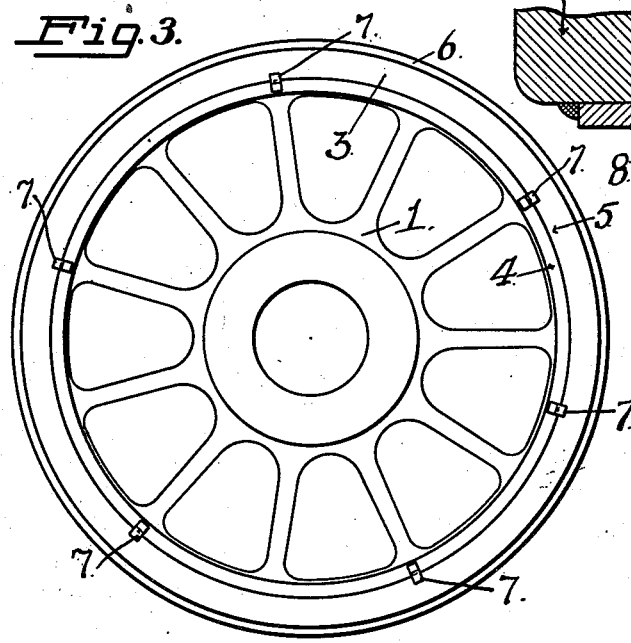
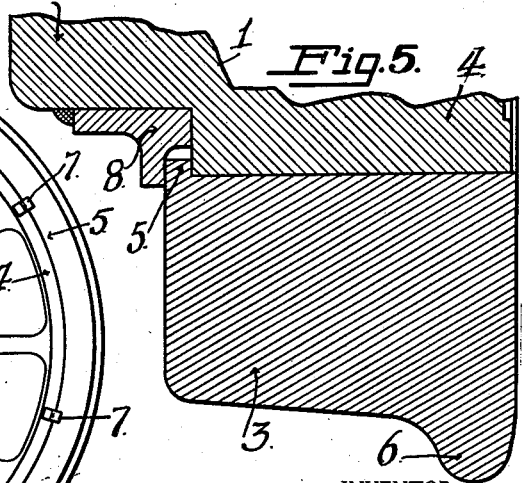
INVENTOR.
George McCormick
BY Booth & Booth
ATTORNEYS.

Patented Aug. 26, 1930

1,773,740

UNITED STATES PATENT OFFICE

GEORGE McCORMICK, OF SAN FRANCISCO, CALIFORNIA

METAL-TIRED RAILWAY WHEEL

Application filed February 26, 1929. Serial No. 342,887.

My invention relates, in general, to railway-equipment, and, in particular, to metal-tired railway-wheels. It consists in a wheel comprising a metal center; a metal-tire fitted to the rim of said center, said tire having a gauge-flange on the inner side of its tread, and having also a retaining lip on its outer side which overlaps and bears against the outer side of the rim; and a plurality of spaced clips secured to the wheel and bearing against the outside of the tire.

In the accompanying drawings Fig. 1 is a side view of a locomotive main driving wheel, embodying my invention.

Fig. 2 is a broken side view of a driving wheel other than a main driving wheel, showing my invention.

Fig. 3 is a side view, showing my invention with respect to a trailing truck wheel.

Fig. 4 is a fragmentary section on the line 4—4 of Fig. 1, illustrating the clips 7 secured to the rim of the wheel center, as in the upper part of Fig. 1, and in Figs. 2 and 3.

Fig. 5 is a fragmentary section on the line 5—5 of Fig. 1, showing the clips secured to the counterbalance weight, as in the lower portion of Fig. 1.

It is to be understood that these clips may be modified to suit various designs of wheel centers and tires, and the method of fastening them may be electric welding, autogenous welding, or other suitable fastening such as bolting or riveting.

The object of my invention is to provide means whereby a tire such as commonly used on locomotive driving wheels, trailing wheels, and other railway equipment, may be prevented from getting out of gauge should said tire become loose. The objectionable results of loose tires due to insufficient shrinkage or other cause will be largely overcome by holding the tires in proper alignment and gauge. With my improvement, a tire that becomes loose will be thus held, it being prevented from moving laterally in either direction but free to move circumferentially. The results of tires moving laterally or in a transverse direction to the rotation of the wheel is that the tires get out of gauge and may become cocked on the wheel center in such a manner as to cause the wheel or the tire to climb the rail or other parts of the track, causing derailments and resultant injuries to the track, equipment, property, and loss of life and limb.

Referring to Fig. 1, the numeral 1 indicates a main driving wheel-center of a locomotive. 2 is its counterbalance weight. In ordinary practice, the tire 3 is held in place on the rim 4 of the wheel center by shrinkage on the face of the rim, and by a retaining lip or shoulder 5 which overlaps and bears against the outer side of the rim. The purpose of the lip or shoulder 5 is to prevent the tire from moving laterally towards center of track, it being considered that the gauge flange 6 on the opposite side of the tire, coming in contact with the rail, will prevent the tire from working transversely outwardly from the center of the track. This, however, from practice and experience, does not always obtain. It will be readily seen that should a tire become loose on the center by reason of insufficient shrinkage, overheating, stretching, or rolling out by continued use, it can move on said center in a transverse direction outwardly or from the center of the track; which movement may or may not be even over the entire circumference of the wheel center, thus permitting the tire to either become wider in gauge, or on account of an uneven movement on the center it may become cocked or askew with relation to the direction of rotation, thereby causing the tire to mount the rail or other members of the track structure, resulting in derailment and injuries to track, equipment, property and loss of life and limb.

7 and 8 indicate a plurality of clips, spaced apart, say by a distance of every other spoke, designed and applied to the outside of wheel and held in position by welding or other suitable means. These bear upon the retaining lip 5 and their effect is to prevent the tire from moving outwardly on the wheel center, and acting, together with said retaining lip 5, will eliminate any change of tire gauge on account of the movement of the tire on the wheel center due to becoming loose.

The clips may be of forms suitable for their place of attachment to the wheel. For example, the type of clip indicated by 7 is secured to the rim 4, as shown in Fig. 4; also in the upper part of the main driving wheel of Fig. 1 and in the other wheels of Figs. 2 and 3. The type of clip indicated by 8 is secured to the counter weight 2, as shown in Fig. 5 and in the lower part of Fig. 1.

Among the advantages which have developed in practical service by my invention, it may be noted that when it becomes necessary to apply shims between the tire and wheel center, after the tire has become loose, said shims may be applied from the inside without removing the clips, the clips in this case becoming an aid, as they hold the tire in proper position while the shims are being applied, preventing the tire from getting out of gauge or position on the wheel center. This is not possible on wheels equipped with retaining rings. It also has the further advantage of leaving the inside surface of tire and wheel center uncovered and open for ready inspection, which is an aid in determining any undue looseness of the tire. Also, owing to the clips only covering a small portion of the outside surface of tire and wheel center, the inspector is aided in determining any slight movement of tire indicating looseness. While these clips may be made a permanent part of wheel center by electric or autogenous welding, insuring permanency, they may be readily removed when necessary to change the tire, by chipping off or cutting off in a lathe, or by other mechanical means.

It will be understood that various changes in details of construction or form may be made without departing from the spirit or scope of the invention as defined by the appended claims.

I claim:—

1. A railway-wheel comprising a metal center having an imperforate rim; a metal tire fitted upon said rim and having a gauge flange on its inner side and a retaining lip on its outer side, the latter bearing against the outer side of the wheel rim; and a plurality of spaced imperforate clips welded to the outer side of the imperforate wheel rim and bearing against the outer face of the retaining lip.

2. A railway-wheel comprising a metal center having a rim with a counterbalance weight; a metal tire fitted upon said rim, said tire having on its inner side a gauge flange and on its outer side a retaining lip bearing upon the outer side of the wheel rim; and a plurality of spaced clips some secured to the wheel rim and others to the counterbalance weight and bearing against the retaining lip of the tire.

3. A railway wheel comprising a metal center having an imperforate rim with a counterbalance weight; a metal tire fitted upon said rim, said tire having on its inner side a gauge flange and on its outer side a retaining lip bearing upon the outer side of the wheel rim; and a plurality of spaced imperforate clips welded some to the wheel rim and others to the counterbalance weight and bearing against the retaining lip of the tire.

In testimony whereof I have signed my name to this specification.

GEORGE McCORMICK.